US008361367B2

(12) United States Patent
Hess et al.

(10) Patent No.: US 8,361,367 B2
(45) Date of Patent: Jan. 29, 2013

(54) FLAME SIMULATING ASSEMBLY

(75) Inventors: Kristoffer Hess, Cambridge (CA); Martyn Champ, Cambridge (CA); Michael Jach, Kitchener (CA); Kelly Stinson, Cambridge (CA)

(73) Assignee: Dimplex North America Limited, Cambridge, ON (CA)

( * ) Notice: Subject to any disclaimer, the term of this patent is extended or adjusted under 35 U.S.C. 154(b) by 0 days.

(21) Appl. No.: 13/306,480

(22) Filed: Nov. 29, 2011

(65) Prior Publication Data

US 2012/0070583 A1 Mar. 22, 2012

Related U.S. Application Data

(62) Division of application No. 11/252,596, filed on Oct. 19, 2005.

(51) Int. Cl.
*B29C 33/38* (2006.01)
*B29C 41/04* (2006.01)

(52) U.S. Cl. ......... 264/225; 264/310; 264/312; 264/313

(58) Field of Classification Search ........................ None
See application file for complete search history.

(56) References Cited

U.S. PATENT DOCUMENTS

| | | | |
|---|---|---|---|
| 566,564 | A | 8/1896 | Dewey |
| 1,531,171 | A | 3/1925 | Berry et al. |
| 1,586,597 | A | 6/1926 | Berry |
| 1,590,083 | A | 6/1926 | Collins |
| 1,692,021 | A | 11/1928 | Auer |
| 1,703,761 | A | 2/1929 | Berry |
| 1,719,622 | A | 7/1929 | Price |
| 1,768,284 | A | 6/1930 | Berry |
| 1,809,164 | A | 6/1931 | Gritt |
| 1,827,941 | A | 10/1931 | Gross |
| 1,839,165 | A | 12/1931 | Roseby |
| 1,843,279 | A | 2/1932 | Gritt |
| 1,867,740 | A | 7/1932 | Guy |
| 1,901,294 | A | 3/1933 | Gritt et al. |
| 1,992,540 | A | 2/1935 | Newton |
| 2,285,535 | A | 6/1942 | Schlett |
| 2,631,040 | A | 3/1953 | Constantine |
| 2,708,114 | A | 5/1955 | Hancock |
| 2,963,807 | A | 12/1960 | Relph et al. |
| 2,984,032 | A | 5/1961 | Cornell |
| 3,175,552 | A | 3/1965 | Sutton |
| 3,395,475 | A | 8/1968 | Moss |

(Continued)

FOREIGN PATENT DOCUMENTS

| | | |
|---|---|---|
| EP | 0170521 | 2/1986 |
| EP | 0194157 | 9/1986 |

(Continued)

OTHER PUBLICATIONS

Decision of the United States Court of Appeals for the Federal Circuit, re *Terlep* v. *The Brinkmann Corp* et al., dated Aug. 16, 2005.

*Primary Examiner* — Mary F Theisen

(57) ABSTRACT

A method of forming a simulated combustible fuel element for simulating a semi-burned combustible fuel element, including, first, covering a surface of the semi-burned combustible fuel element with a material selected to produce a resiliently flexible mold, and second, after the selected material has set, removing the semi-burned combustible fuel element from the mold. Next, a predetermined amount of liquefied body material is introduced into the mold, and a body is produced resembling the semi-burned combustible fuel element with one or more cavities therein and an exterior surface simulating the surface of the semi-burned combustible fuel element, the body including one or more light passages. After the body material is cured, the mold is removed from the body.

12 Claims, 14 Drawing Sheets

U.S. PATENT DOCUMENTS

| | | | |
|---|---|---|---|
| 3,395,476 | A | 8/1968 | Moss et al. |
| 3,445,948 | A | 5/1969 | Moss et al. |
| 3,499,239 | A | 3/1970 | Mungo |
| 3,500,126 | A | 3/1970 | Ford |
| 3,506,876 | A | 4/1970 | Antonich |
| 3,526,984 | A | 9/1970 | Nielsen et al. |
| 3,603,013 | A | 9/1971 | Reed et al. |
| 3,699,697 | A | 10/1972 | Painton |
| 3,710,182 | A | 1/1973 | Van Reenen |
| 3,742,189 | A | 6/1973 | Conroy et al. |
| 3,930,490 | A | 1/1976 | Lassy et al. |
| 3,978,598 | A | 9/1976 | Rose et al. |
| 4,026,544 | A | 5/1977 | Plambeck et al. |
| 4,064,414 | A | 12/1977 | Bergeson et al. |
| 4,253,045 | A | 2/1981 | Weber |
| 4,272,908 | A | 6/1981 | Bassetti et al. |
| 4,510,556 | A | 4/1985 | Johnson |
| 4,557,954 | A | 12/1985 | Gundlach et al. |
| 4,573,905 | A | 3/1986 | Meyers |
| 4,890,600 | A | 1/1990 | Meyers |
| 4,965,707 | A | 10/1990 | Butterfield |
| 5,032,766 | A | 7/1991 | Gundlach et al. |
| 5,195,820 | A | 3/1993 | Rehberg |
| 5,594,433 | A | 1/1997 | Terlep |
| 5,594,802 | A | 1/1997 | Berghoff et al. |
| 5,612,266 | A | 3/1997 | Delvaux et al. |
| 5,635,898 | A | 6/1997 | Walters et al. |
| 5,642,580 | A | 7/1997 | Hess et al. |
| 5,700,409 | A | 12/1997 | Corry |
| 5,774,040 | A | 6/1998 | Lastoria |
| 5,823,784 | A | 10/1998 | Lane |
| 5,826,357 | A | 10/1998 | Hechler |
| 5,924,784 | A | 7/1999 | Chliwnyj et al. |
| 6,006,742 | A | 12/1999 | Jamieson et al. |
| 6,047,489 | A | 4/2000 | Hess et al. |
| 6,050,011 | A | 4/2000 | Hess et al. |
| 6,053,165 | A | 4/2000 | Butler et al. |
| 6,077,467 | A | 6/2000 | Sinsley |
| 6,133,181 | A | 10/2000 | Wentworth et al. |
| 6,139,786 | A | 10/2000 | Corry |
| 6,162,047 | A | 12/2000 | Hess |
| 6,269,567 | B1 | 8/2001 | Hess et al. |
| 6,302,555 | B1 | 10/2001 | Bristow |
| 6,363,636 | B1 | 4/2002 | Hess et al. |
| 6,385,881 | B1 | 5/2002 | Hess |
| 6,393,207 | B1 | 5/2002 | Martin et al. |
| 6,413,079 | B1 | 7/2002 | Lyons et al. |
| 6,447,906 | B1 | 9/2002 | Andrejcak et al. |
| 6,554,443 | B2 | 4/2003 | Fan |
| 6,564,485 | B1 | 5/2003 | Hess et al. |
| 6,615,519 | B2 | 9/2003 | Hess |
| 6,616,308 | B2 | 9/2003 | Jensen et al. |
| 6,688,752 | B2 | 2/2004 | Moore |
| 6,691,440 | B1 | 2/2004 | Petz et al. |
| 6,718,665 | B2 | 4/2004 | Hess et al. |
| 6,719,443 | B2 | 4/2004 | Gutstein et al. |
| 6,757,487 | B2 | 6/2004 | Martin et al. |
| 6,793,697 | B2 | 9/2004 | Sprules et al. |
| 6,880,275 | B2 | 4/2005 | Mix et al. |
| 6,919,884 | B2 | 7/2005 | Mix et al. |
| 7,134,229 | B2 | 11/2006 | Hess et al. |
| 7,194,830 | B2 | 3/2007 | Hess |
| 7,373,743 | B1 | 5/2008 | Hess |
| 7,686,471 | B2 | 3/2010 | Reichow |
| 2001/0033488 | A1 | 10/2001 | Chliwnyj et al. |
| 2002/0093834 | A1 | 7/2002 | Yu et al. |
| 2002/0152655 | A1 | 10/2002 | Merrill et al. |
| 2002/0166554 | A1 | 11/2002 | Berg |
| 2002/0174579 | A1 | 11/2002 | Corry et al. |
| 2003/0046837 | A1 | 3/2003 | Hess |
| 2003/0049024 | A1 | 3/2003 | Chen |
| 2003/0072565 | A1 | 4/2003 | Ravnbo-West |
| 2003/0110671 | A1 | 6/2003 | Hess |
| 2003/0126775 | A1 | 7/2003 | Corry et al. |
| 2003/0156828 | A1 | 8/2003 | Jamieson et al. |
| 2003/0201957 | A1 | 10/2003 | Mix et al. |
| 2004/0060213 | A1 | 4/2004 | Schroeter et al. |
| 2004/0114351 | A1 | 6/2004 | Stokes et al. |
| 2004/0173202 | A1 | 9/2004 | Lyons et al. |
| 2004/0173204 | A1 | 9/2004 | Early et al. |
| 2004/0181983 | A1 | 9/2004 | Hess et al. |
| 2004/0255931 | A1 | 12/2004 | Bachinski et al. |
| 2004/0264949 | A1 | 12/2004 | Deng |
| 2005/0063685 | A1 | 3/2005 | Bristow |
| 2005/0086841 | A1 | 4/2005 | Schroeter et al. |
| 2005/0097792 | A1 | 5/2005 | Naden |
| 2005/0155262 | A1 | 7/2005 | Mix et al. |
| 2005/0252051 | A1 | 11/2005 | Chen |
| 2006/0023443 | A1 | 2/2006 | Connelly et al. |
| 2006/0026894 | A1 | 2/2006 | Hess et al. |
| 2006/0153547 | A1 | 7/2006 | O'Neill |
| 2006/0162198 | A1 | 7/2006 | Hess et al. |
| 2006/0185664 | A1 | 8/2006 | Butler et al. |
| 2006/0188831 | A1 | 8/2006 | Hess et al. |
| 2006/0242870 | A1 | 11/2006 | Atemboski et al. |
| 2007/0094903 | A1 | 5/2007 | Hess et al. |
| 2007/0107280 | A1 | 5/2007 | Stinson et al. |
| 2007/0224561 | A1 | 9/2007 | Hess et al. |

FOREIGN PATENT DOCUMENTS

| | | |
|---|---|---|
| EP | 0348137 | 12/1989 |
| EP | 0611921 | 8/1994 |
| EP | 1020685 | 7/2000 |
| EP | 1271060 | 1/2003 |
| EP | 1439351 | 7/2004 |
| GB | 0186234 | 9/1922 |
| GB | 0210968 | 2/1924 |
| GB | 0249321 | 3/1926 |
| GB | 0272836 | 6/1927 |
| GB | 0274615 | 7/1927 |
| GB | 0322688 | 12/1929 |
| GB | 0370618 | 4/1932 |
| GB | 0371732 | 4/1932 |
| GB | 0397594 | 8/1933 |
| GB | 0410123 | 5/1934 |
| GB | 0414280 | 8/1934 |
| GB | 0416358 | 9/1934 |
| GB | 0426887 | 4/1935 |
| GB | 0631594 | 11/1949 |
| GB | 0928851 | 6/1963 |
| GB | 0957591 | 5/1964 |
| GB | 0968568 | 9/1964 |
| GB | 0975009 | 11/1964 |
| GB | 0978364 | 12/1964 |
| GB | 0978365 | 12/1964 |
| GB | 1024047 | 3/1966 |
| GB | 1088577 | 10/1967 |
| GB | 1097812 | 1/1968 |
| GB | 1113209 | 5/1968 |
| GB | 1164143 | 9/1969 |
| GB | 1186655 | 4/1970 |
| GB | 1212399 | 11/1970 |
| GB | 1266131 | 3/1972 |
| GB | 1272644 | 5/1972 |
| GB | 1298455 | 12/1972 |
| GB | 1407926 | 10/1975 |
| GB | 1443772 | 7/1976 |
| GB | 2137336 | 10/1984 |
| GB | 2149090 | 6/1985 |
| GB | 2151772 | 7/1985 |
| GB | 2180927 | 4/1986 |
| GB | 2198835 | 6/1988 |
| GB | 2210969 | 6/1989 |
| GB | 2222000 | 2/1990 |
| GB | 2230335 | 10/1990 |
| GB | 2240171 | 7/1991 |
| GB | 2241575 | 9/1991 |
| GB | 2242737 | 10/1991 |
| GB | 2251935 | 7/1992 |
| GB | 2256040 | 11/1992 |
| GB | 2264555 | 9/1993 |
| GB | 2267563 | 12/1993 |
| GB | 2275105 | 8/1994 |
| GB | 2276444 | 9/1994 |
| GB | 2288052 | 10/1995 |
| GB | 2290374 | 12/1995 |
| GB | 2290865 | 1/1996 |

| | | |
|---|---|---|
| GB | 2298073 | 8/1996 |
| GB | 2302172 | 1/1997 |
| GB | 2302730 | 1/1997 |
| GB | 2303718 | 2/1997 |
| GB | 2307132 | 5/1997 |
| GB | 2315543 | 2/1998 |
| GB | 2321700 | 8/1998 |
| GB | 2325733 | 12/1998 |
| GB | 2345960 | 7/2000 |
| GB | 2350182 | 11/2000 |
| GB | 2371854 | 8/2002 |
| GB | 2372807 | 9/2002 |
| GB | 2377752 | 1/2003 |
| GB | 2379009 | 2/2003 |
| GB | 2404730 | 2/2005 |
| GB | 2408322 | 5/2005 |
| GB | 2408794 | 6/2005 |
| GB | 2409323 | 6/2005 |
| GB | 2418984 | 4/2006 |
| GB | 2427021 | 12/2006 |
| WO | 97/41393 | 11/1997 |
| WO | 98/54516 | 12/1998 |
| WO | 99/45326 | 9/1999 |
| WO | 01/57447 | 8/2001 |
| WO | 2004027321 | 4/2004 |
| WO | 2004109189 | 12/2004 |
| WO | 2005028962 | 3/2005 |
| WO | 2005078350 | 8/2005 |
| WO | 2006/027273 | 3/2006 |
| WO | 2006027272 | 3/2006 |
| WO | 2006040167 | 4/2006 |
| WO | 2006040342 | 4/2006 |
| WO | 2006128917 | 12/2006 |
| WO | 2007021188 | 2/2007 |
| WO | 2007039126 | 4/2007 |
| WO | 2008149117 | 12/2008 |
| WO | 2008151951 | 12/2008 |

FLAME SIMULATING ASSEMBLY

This is a divisional application of application Ser. No. 11/252,596, filed Oct. 19, 2005, which application is incorporated herein by reference.

FIELD OF THE INVENTION

This invention is related to a method of forming a simulated combustible fuel element.

BACKGROUND OF THE INVENTION

Various types of flame simulating assemblies, such as electric fireplaces, are known. Many of the prior art flame simulating assemblies include a simulated fuel bed which resembles a burning solid combustible fuel, as well as embers and ashes resulting from the combustion. For example, U.S. Pat. No. 566,564 (Dewey) discloses an electric heating apparatus with a cover (B') which "is made . . . of a transparent or semitransparent material" (p. 1, lines 50-52). The cover is "fashioned or colored" so that it resembles coal or wood "in a state of combustion when light is radiated through it" (p. 1, lines 53-57).

However, the use of a cover or a (partially translucent shell) such as the cover disclosed in Dewey to imitate burning solid combustible fuel has some disadvantages. First, a portion of the shell typically is formed to simulate the fuel (e.g., logs), and another portion of the shell simulates an ember bed (i.e., embers and ashes) which results from combustion of the fuel. For instance, where the combustible fuel to be simulated is wood in the form of logs, the logs are simulated in the shell by raised parts which are integral to the shell, rather than pieces which are physically separate from the ember bed. Because it is evident from even a cursory observation of this type of prior art simulated fuel bed that the raised parts (i.e., simulated logs) are actually formed integrally with the simulated ember bed part of the shell, this type of simulated fuel bed tends to detract from the simulation effect sought.

Another disadvantage of the prior art results from characteristics of the typical light source which is intended to provide light which imitates the light produced by glowing embers in a real fire. In the prior art, the same light source is often used to provide both a flame effect (i.e., to simulate flames), and an ember simulation effect (i.e., to simulate glowing embers). However, the characteristics of light from embers are somewhat different from those of light from flames. For instance, embers generally tend to glow, and pulsate, but flames tend to flicker, and move. Because of these differences, attempts in the prior art to use the same light source to provide a flame simulation effect and a burning ember simulation effect have had somewhat limited success.

Also, the positioning of the light source intended to provide the ember simulation effect is somewhat unsatisfactory in the prior art. In a natural fire, most glowing embers are located on partially-consumed fuel, and the balance of the glowing embers are located in the ember bed. However, in the prior art, the relevant light source is positioned somewhat lower than the simulated fuel portions, i.e., beneath the shell. Accordingly, because the light which is simulating the light from glowing embers is located well below the shell, an observer can easily see that the light does not originate in the vicinity of the raised portions representing logs, but instead is originating from below the shell. In this way, the usual location of the light source in the prior art undermines the simulation effect.

U.S. Pat. No. 2,285,535 (Schlett) discloses an attempt to address the problem of the fuel parts being obviously integrally formed with the simulated ember bed. Schlett discloses a "fireplace display" including "an arrangement of actual fuel or of a fuel imitation . . . such as imitation wood logs" (p. 1, lines 22-24). In Schlett, therefore, the problem of the simulated logs appearing unrealistically to be part of the simulated ember bed is apparently addressed by the "fuel" (i.e., either actual logs or imitation logs, and also either actual lumps of coal or imitations thereof) being presented as discrete physical entities in the absence of an ember bed (as shown in FIG. 2 in Schlett). Also, Schlett does not disclose any attempt to simulate glowing embers in the fuel.

WO 01/57447 (Ryan) discloses another attempt to provide a more realistic simulated fuel bed. Ryan discloses "hollow simulated logs", each of which includes an ultraviolet light tube (p. 11, lines 25-27). The simulated logs are described as preferably being made from cardboard tubing, but also may be constructed in other ways (p. 12, lines 18-27 and p. 13, line 1). An ember simulator is provided which is painted with fluorescent paint (p. 18, lines 4-6). Also, silk flame elements, meant to simulate flames, are treated so that they fluoresce when exposed to ultraviolet light from the ultraviolet light tubes positioned in the cardboard tubing. The tubing includes apertures to permit exposure of fluorescent elements to ultraviolet light from inside the tubing. However, the tubing appears unrealistic in appearance, and the fluorescing portions would appear to be unconvincing imitations of flames and embers, which would generally not be fluorescent in a natural fire.

In addition, the flame simulating assemblies of the prior art typically do not provide for control, beyond activation and de-activation, of the light sources providing images of flames or other light sources. In particular, prior art flame simulating assemblies do not typically include controls which provide for increases or decreases in the intensity of the light provided by one or more light sources in relation to ambient light intensity.

There is therefore a need for a simulated fuel bed to overcome or mitigate at least one of the disadvantages of the prior art.

SUMMARY OF THE INVENTION

In its broad aspect, the invention provides a method of forming a simulated combustible fuel element for simulating a semi-burned combustible fuel element. The method includes, first, covering a surface of the semi-burned combustible fuel element with a material selected to produce a resiliently flexible mold. After the selected material has set, the semi-burned combustible fuel element is removed from the mold. Next, a predetermined amount of a liquefied body material is introduced into the mold. The mold is rotated to produce a body made of the body material and resembling the semi-burned combustible fuel element, the predetermined amount being sufficient to provide the body with one or more cavities therein and an exterior surface simulating the surface of the semi-burned combustible fuel element. The body is cured, to solidify the body material, and the mold is removed from the body. One or more light sources are at least partially positioned in the cavity. At least a portion of the exterior surface is coated in accordance with a predetermined exterior surface pattern to provide one or more light-transmitting parts positioned in a path of light from the light source, each light-transmitting part being colored to resemble glowing embers of the combustible fuel upon transmission therethrough of light from the light source. Also provided are one or more substantially opaque exterior parts for substantially preventing transmission of light from the light source therethrough colored to resemble a non-ember part of the combustible fuel.

In another aspect, the invention provides, after the mold is removed, the step of forming an access hole in the body in communication with the cavity, to permit the light source to be at least partially inserted in the cavity through the access hole.

In yet another aspect, after the light source is at least partially positioned in said at least one cavity, plug material is inserted into the access hole, to substantially block the access hole.

In another of its aspects, the invention provides a method of forming a simulated combustible fuel element for simulating a semi-burned combustible fuel element. The method includes, first, covering a surface of the semi-burned combustible fuel element with a material selected to produce a resiliently flexible mold, and then, after the selected material has set, removing the semi-burned combustible fuel element from the mold. Next, a predetermined amount of a liquefied body material is introduced into the mold. The mold is rotated to produce a body made of the body material and resembling the semi-burned combustible fuel element. The predetermined amount is sufficient to provide the body with one or more cavities therein and an exterior surface simulating the surface of the semi-burned combustible fuel element. The body also includes one aperture extending between the exterior surface and the cavity. The body is cured to solidify the body material. Next, the mold is removed from the body. One or more light sources are positioned in the cavity in relation to the aperture to permit light from the light source to be transmitted through the aperture, to resemble glowing embers of the combustible fuel.

In another aspect, at least a portion of the exterior surface of the body is coated in accordance with a predetermined exterior surface pattern so that the exterior surface resembles the surface of the semi-burned combustible fuel element.

In yet another of its aspects, the invention provides a method of forming a simulated combustible fuel element for simulating a semi-burned combustible fuel element. The method includes, first, covering a surface of the semi-burned combustible fuel element with a material selected to produce a resiliently flexible mold. Next, after the selected material has set, the semi-burned combustible fuel element is removed from the mold. A predetermined amount of a liquefied body material is introduced into the mold. Next, the mold is rotated to produce a body made of the body material and resembling the semi-burned combustible fuel element, the predetermined amount being sufficient to provide the body with one or more cavities therein and an exterior surface simulating the surface of the semi-burned combustible fuel element, the body having one or more light passages. The body is curved to solidify the body material. Next, the mold is removed from the body. One or more light sources are at least partially positioned in the cavity so that the light passage is located in a path of light from the light source, the light passage being formed to resemble glowing embers of the combustible fuel upon transmission therethrough of light from the light source.

BRIEF DESCRIPTION OF THE DRAWINGS

The invention will be better understood with reference to the drawings, in which.

DETAILED DESCRIPTION

Figure 2:
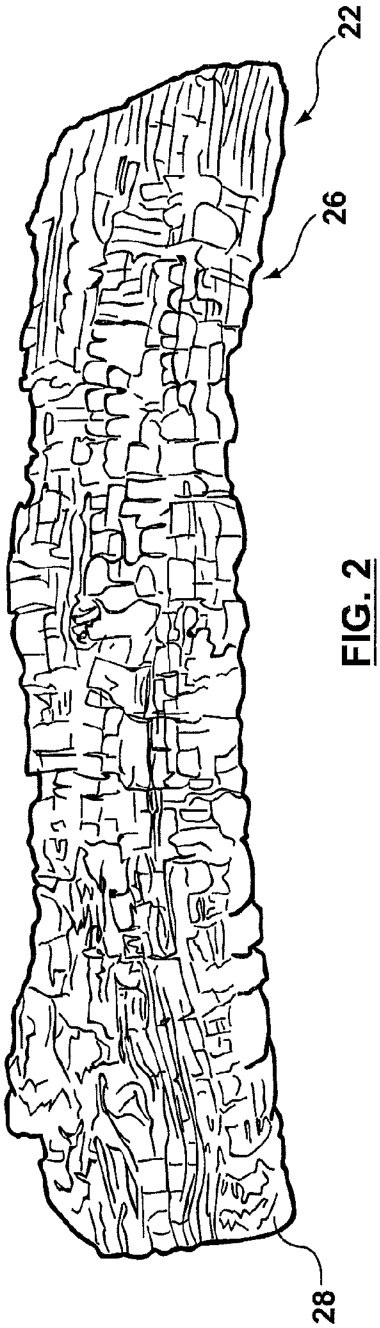
FIG. 2 is a bottom view of the simulated solid combustible fuel element of FIG. 1.
Figure 3:
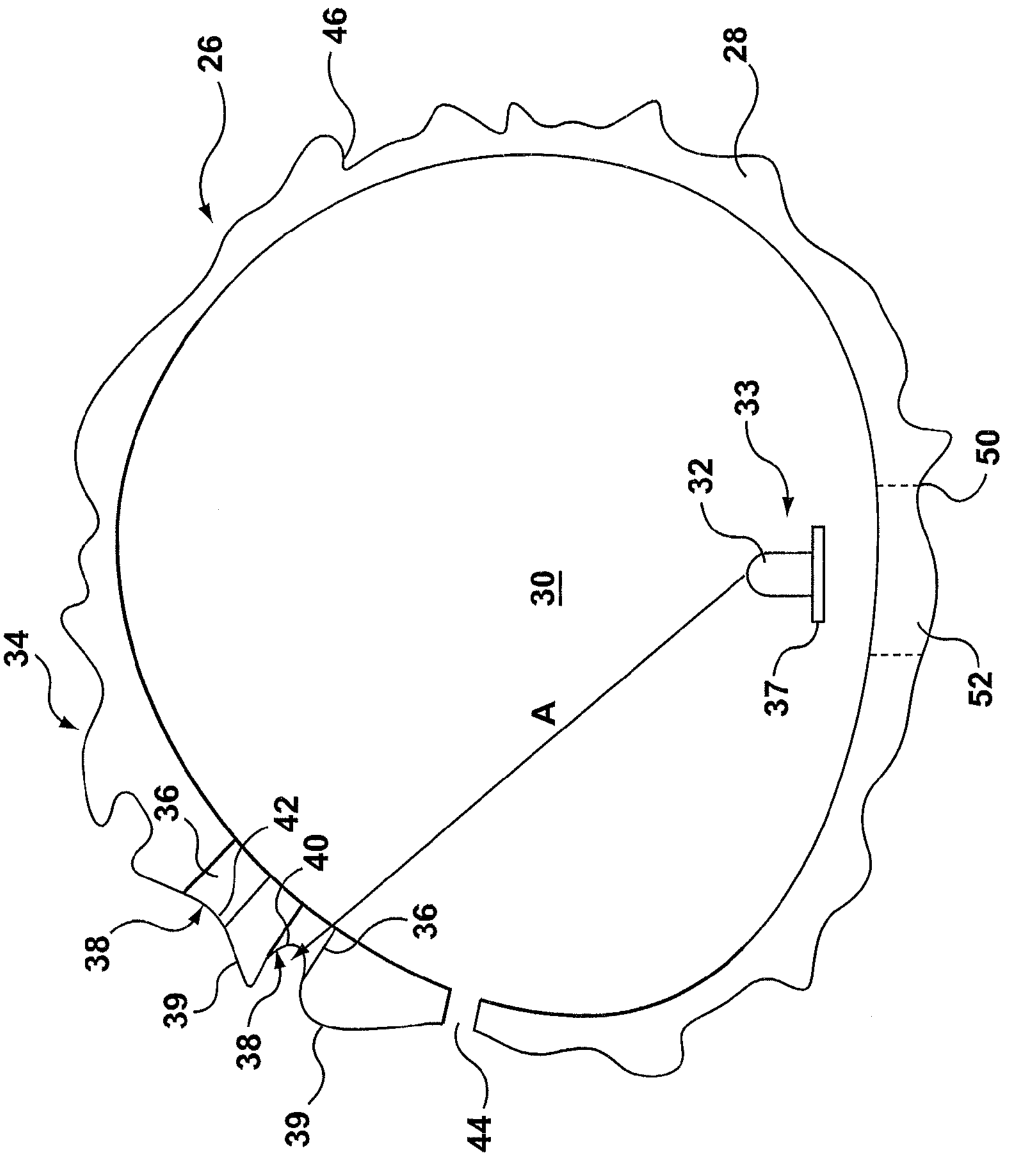
FIG. 3 is a cross-section of an embodiment of the simulated solid combustible fuel element of the invention, drawn at a larger scale.
Figure 4A:
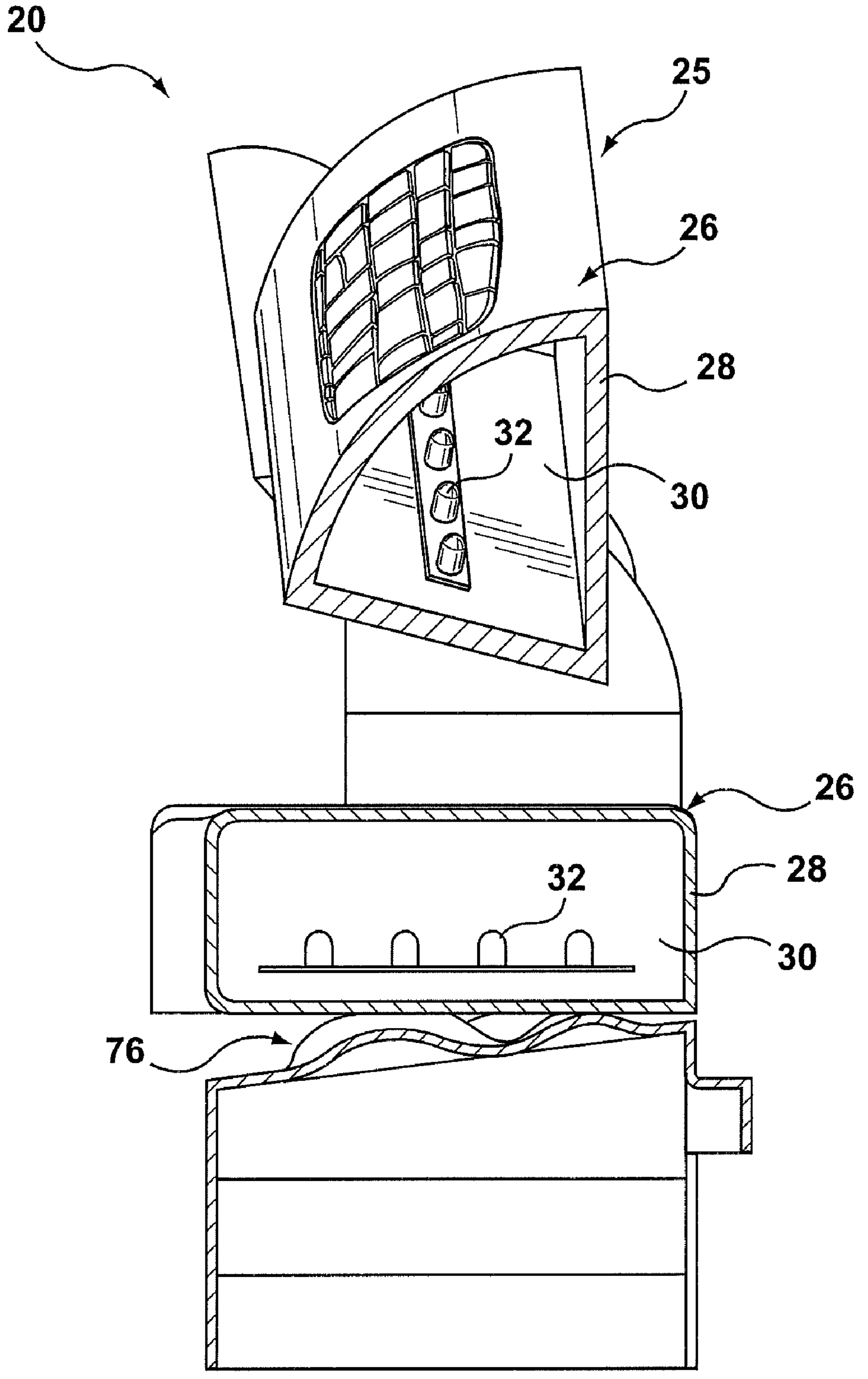
FIG. 4A is a cross-section of an embodiment of a simulated fuel bed of the invention, drawn at a larger scale.
Figure 4B:
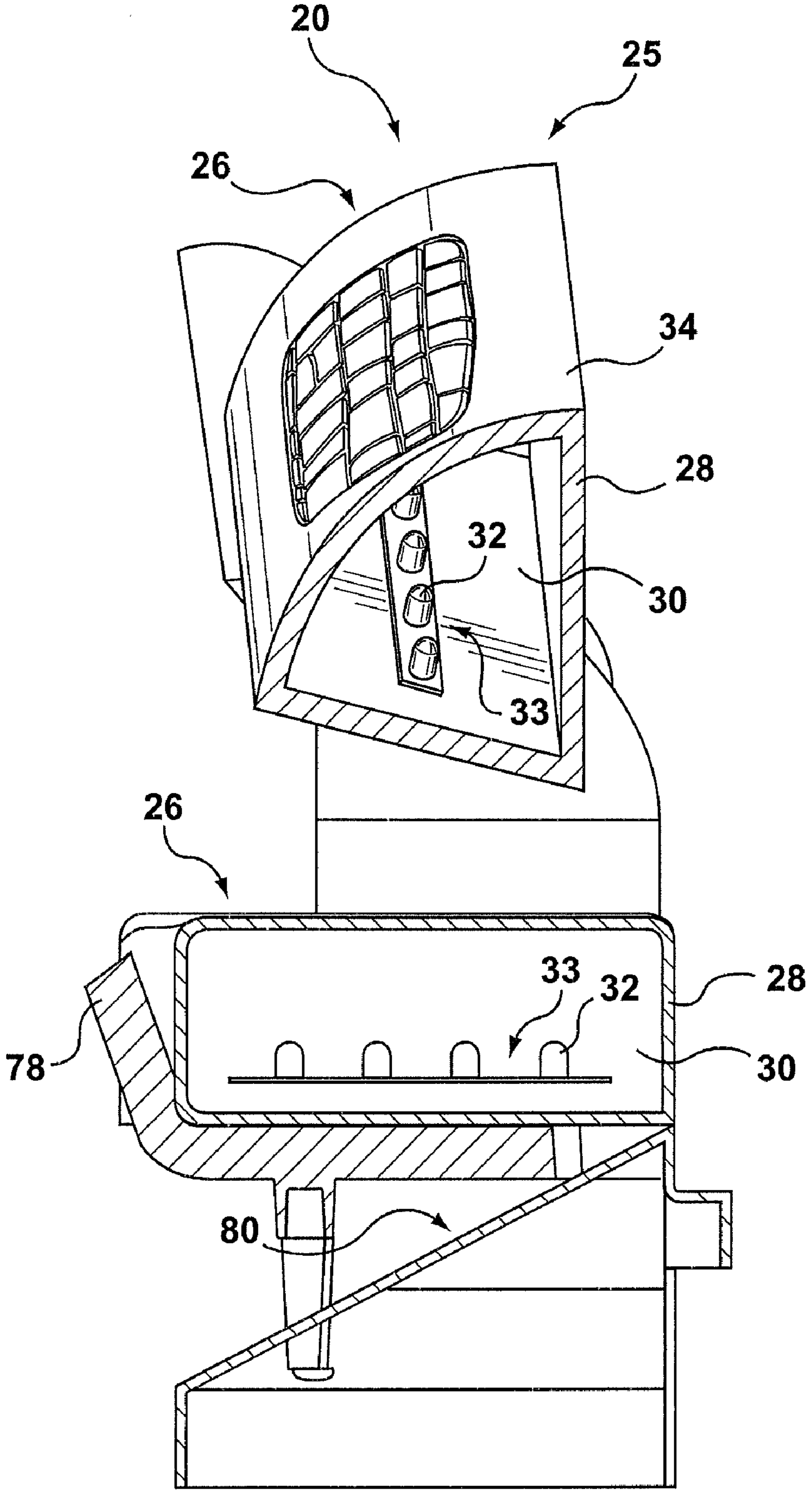
FIG. 4B is a cross-section of an alternative embodiment of the simulated fuel bed of the invention.

Reference is first made to FIGS. 1-7 to describe an embodiment of a simulated fuel bed in accordance with the invention indicated generally by the numeral 20 (FIGS. 4A, 4B). The simulated fuel bed 20 is for simulating a solid combustible fuel burning, and partially consumed, in a natural fire. Preferably, the simulated fuel bed 20 includes a number of simulated solid combustible fuel elements 22 (FIGS. 7, 8), for simulating fuel elements which have not been consumed by the fire, or have only partially been consumed. Each simulated combustible fuel element 22 has a body 24 which is colored and formed to resemble an entire solid combustible fuel element, as will be described.

Figure 5:
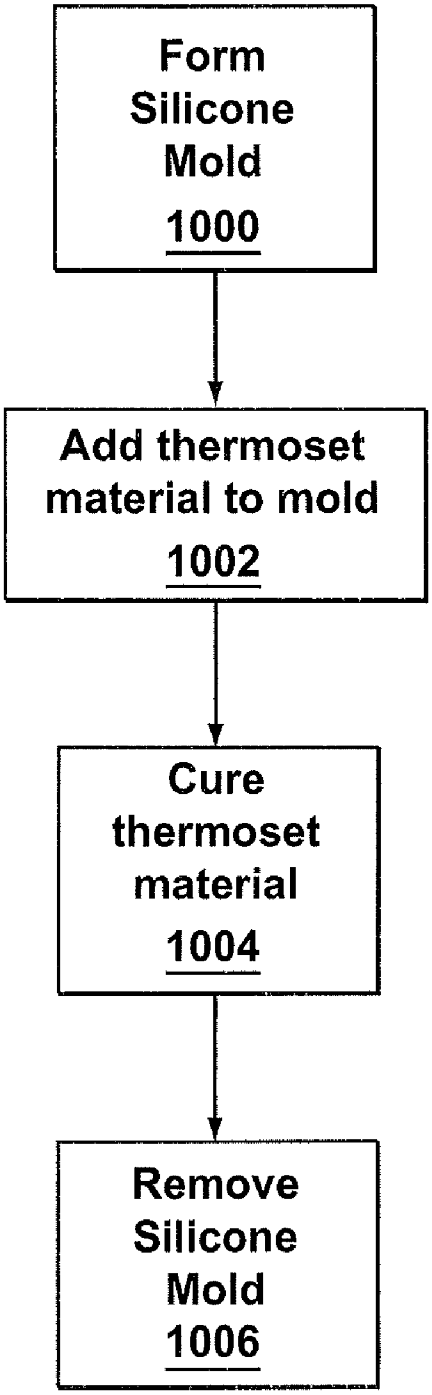
FIG. 5 is a functional block diagram schematically representing a method of forming the simulated solid combustible fuel elements of the invention.

As shown in FIGS. 4A, 4B and 5, the elements 22 are preferably arranged in a pile 25, for instance, to imitate a pile of wooden logs in a natural fire. It will be understood that the simulated fuel elements 22 may, in the alternative, be formed and colored to resemble pieces of coal. Where the simulated fuel elements 22 are formed to resemble pieces of coal, the simulated fuel elements 22 are preferably arranged in a pile, positioned to resemble a pile of coal in a natural fire.

Preferably, the simulated solid combustible fuel elements 22 include one or more light-producing simulated solid combustible fuel elements 26. In one embodiment, each light-producing simulated solid combustible fuel element 26 preferably has a body 28 which is also colored and formed to resemble an entire solid combustible fuel element, and which includes one or more cavities 30 therein. The light-producing simulated solid combustible fuel element 26 also preferably includes one or more fuel light sources 32 which are positioned to direct light therefrom inside the cavity 30. As will be described, the light sources 32 in each light-producing simulated solid combustible fuel element 26 are preferably included in a fuel light source subassembly 33. Preferably, the pile 25 includes more than one light-providing simulated fuel element 26, and the elements 26 are positioned and arranged in the pile 25 for optimum simulation of a natural fire, as will be described. It will be understood that, alternatively, only one light-producing simulated fuel element 26 may be used, if desired.

In one embodiment, the body 28 additionally includes an exterior surface 34 and one or more light-transmitting parts 36 extending between the cavity 30 and the exterior surface 34. Each light-transmitting part 36 is preferably positioned in a path of light from the light source 32, as shown schematically by arrow "A" in FIG. 3. Light from the fuel light source 32 is transmittable through the light-transmitting part 36 to the exterior surface 34 for simulating glowing embers of the combustible fuel.

Figure 1:
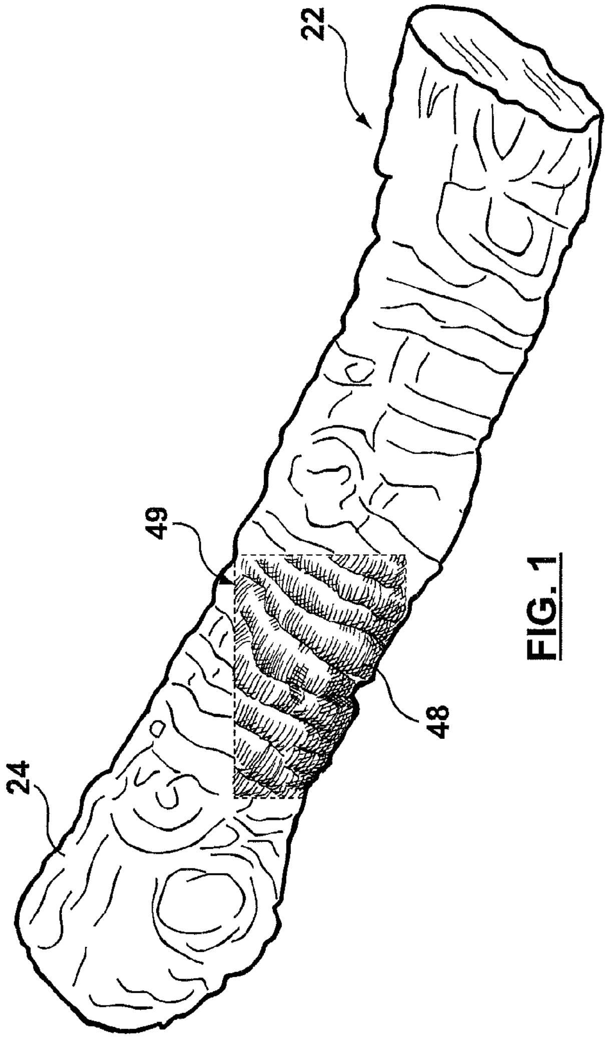
FIG. 1 is an isometric view of a top side and an end of an embodiment of an embodiment of simulated solid combustible fuel element of the invention.

Preferably, and as shown in FIGS. 1 and 2, the bodies 24 of the simulated solid combustible fuel elements 22 are textured to resemble the exterior surfaces of actual solid combustible fuel elements (e.g., wooden logs or pieces of coal) which are partially burned, as will be described. Also, the entire body 24 of each simulated fuel element 22 closely resembles the entire exterior surface of the actual combustible fuel, for a more realistic simulation effect (FIGS. 1-3). It will be understood that the elements 22 are not shown in FIGS. 4A, 4B and 8-9 with detailed exterior surfaces (i.e., as shown in FIGS. 1-3) only in order to simplify the drawings. Because of the process used to form the elements 22, the exterior surfaces thereof include many realistic features, as will be described.

In one embodiment, the fuel light source subassembly 33 preferably includes two or more light sources 32 which are positioned to direct light therefrom inside the cavity 30 to the light-transmitting part 36. Also, it is preferred that each light source 32 is a light-emitting diode (LED). The fuel light source subassembly 33 preferably also includes a printed circuit board (PCB) 37 on which the LEDs 32 are mounted. It will be understood that the PCB 37 includes the necessary circuitry and other electronic components required for operation of the LEDs 32, as is known in the art. The PCB 37 is connectable to a source of electrical power (not shown), for operation of the LEDs 32. The manner in which the PCB 37 is connected to the power source is not shown in the drawings because it is well known in the art.

In the preferred embodiment, and as can be seen in FIG. 3, the light-producing simulated solid combustible fuel element 26 includes the PCB 37 and LEDs 32 mounted thereon (i.e., the fuel light source subassembly 33) located in the cavity 30. The connection of the PCB 37 to the power source may be, for example, via wires (not shown) electrically connected to the PCB 37 inside the cavity 30, and also electrically connected to the power source outside the body 28 of the light-producing simulated solid combustible fuel element 26, for transmission of electrical power to the fuel light source subassembly 33. It will also be understood that various power sources (e.g., batteries positioned inside the cavity 30) could be used with the light source subassembly 33.

As can be seen in FIG. 3, the light-transmitting part 36 is located between a preselected part 38 of the exterior surface 34 and the cavity 30. Preferably, the preselected part 38 is a portion of the exterior surface 34 which has been treated (or left untreated, as the case may be) so that it is capable of substantially transmitting light, and other parts 39 of the exterior surface 34 have been treated so that they substantially block light. The body 28 is preferably formed of a material which is at least partially translucent, as will be described. For reasons further described below, the body material preferably is white in color.

Preferably, and with a view to achieving a realistic appearance, the exterior surface is substantially covered with paint or any suitable coloring agent, in any suitable colors (e.g., black and/or grey and/or brown), mixed and/or positioned as required. However, it is preferred that the paint (or coloring agent) is spread only thinly, or not at all, in or on the preselected parts 38 on the exterior surface 34 which are intended to allow light to be transmitted therethrough, for simulating glowing embers. The preselected parts 38 may be substantially exposed areas 42, and also preferably include one or more crevices 40 (FIG. 3).

For example, the paint or other coloring agent is preferably applied so that it is relatively thin in a substantially exposed area 42, and also so that the paint substantially does not cover the crevice 40 (FIG. 3). Because of this, light from the light source 32 is transmittable directly through the crevice 40 and also through the exposed area 42.

The parts 39 of the exterior surface 34 which are not intended to simulate glowing embers preferably are treated so that they have sufficient paint (or coloring agent) on them to block light from the fuel light source(s) 32. For example, where the fuel which is simulated is wood, the parts 39 preferably resemble the parts of a burning natural log which do not include glowing embers. As shown in FIGS. 1-3, the body 28 preferably resembles an entire log, and the exterior surface 34 therefore preferably includes both one or more preselected parts 38 intended to simulate glowing embers and other parts 39 which are not intended to simulate glowing embers in configurations and arrangements which imitate and resemble different parts respectively of a burning natural log. Similarly, where the fuel which is simulated is coal, the body 28 preferably resembles an entire piece of coal.

The color of the light produced by the fuel light source 32 and the color of the translucent material of the body 28 which includes the light-transmitting part 36 preferably are selected so as to result in a realistic simulation of burning fuel. In one embodiment, the body 28 preferably is primarily a white translucent material (i.e., with paint or any other suitable coloring agent applied on the exterior surface 34, as described above), and the light produced by the fuel light source 32 is any suitable shade of the colors red, yellow or orange or any combination thereof, depending on the burning fuel which the simulated fuel bed 20 is intended to resemble. The term reddish, as used herein, refers to any suitable color or combination or arrangement of colors used in the simulated fuel bed 20 to simulate colors of burning or glowing embers in a natural fire, and/or flames in a natural fire.

Also, the body 28 preferably includes one or more cracks or apertures 44 through which light from the fuel light source 32 is directly observable. The intensity of light from glowing embers in different locations in a natural fire varies. Accordingly, because the light from the fuel light sources 32 which is directly observable is brighter than the light from the sources 32 transmitted through the light-transmitting portions 36, the cracks or apertures 44 provide a realistic simulation due to the variation in intensity of the light from the light source 32 which the cracks or apertures 44 provide, i.e., as compared to the light from the fuel light sources 32 transmitted through the light-transmitting parts 36. In addition to cracks or apertures 44 which may be intentionally formed in the body 28 upon its creation (i.e., in accordance with a predetermined pattern), other cracks or apertures may be formed in the body 28, i.e., other than pursuant to a predetermined pattern. Such cracks or apertures may be formed when the body 28 is created, or they may be formed later, e.g., the simulated fuel elements 22 may crack after an extended period of time. For this reason also, it is preferable that the fuel light sources 32 provide reddish light.

However, it will be understood that other arrangements are possible. For example, in an alternative embodiment, the body material of the light-producing simulated fuel element 26 is colored reddish, and in this case, the light produced by the fuel light source 32 preferably is substantially white, i.e., uncolored.

Preferably, the simulated combustible fuel elements 22 are formed in a silicone rubber mold (FIG. 5). The silicone rubber mold is resiliently flexible. Preferably, a thermoset material (e.g., polyurethane), substantially liquefied, is poured into the mold, which is then rotated (step 1002, FIG. 5). Preferably, the amount of material is sufficient to form the body 28, but also insufficient to form a solid body, so that the cavity 30 is formed inside the body 28 The rotation of the mold is in accordance with rotational molding generally, and will not be described here in detail because it is well known in the art. After rotation, the material is cured (step 1004, FIG. 5). After curing, the mold is peeled off (step 1006, FIG. 5), and realistic surface features such as undercuts (FIG. 3) can be provided. This procedure results in simulated fuel elements 22 with exterior surfaces having a detailed, irregular and realistic texture, such as the elements 22 shown in FIGS. 1-3, simulating an entire exterior surface of a natural log including undercuts 46 (FIG. 3). For example, as can be seen in a detailed area 49 in FIG. 1, the exterior surface 34 may include a plurality of ridges 48 simulating a surface of a semi-burned log. (It will be understood that the area 49 shown in FIG. 1 is exemplary only, and the balance of the surface 34 is understood to resemble the portions of the surface 34 illustrated in area 49. The details of the ridges 48 have not been shown outside the area 49 in FIG. 1, and in FIG. 2 for simplicity of illustration.)

In order to create the silicone rubber mold (step 1000, FIG. 5), first, a sample of semi-burned combustible fuel (e.g., a partially burned log) is covered in silicone rubber, which is then allowed to set. The silicone rubber mold is cut, and then separated from the sample log. Preferably, only one cut is made in the mold. For example, a single cut along a length of the mold large enough to facilitate removal of the sample log is preferred. In most cases, a significant amount of debris (i.e., small pieces of wood which fell off the log) remains in the first mold. In practice, a second mold is required to be taken, in order to obtain a mold which accurately reproduces the surface of the sample but does not include a significant amount of debris. To obtain the second mold, the process described for the first mold is repeated. The second mold tends to have less debris because, for a particular sample log, most of the debris is removed by the first mold. It will be understood that a plurality of sample logs are used in order to provide simulated fuel elements with different bodies, for a more realistic simulation effect.

Where the fuel which is to be simulated is coal, the same procedure is used to create the simulated fuel elements 22, with sample pieces of coal.

Preferably, the body 28 of the light-producing simulated fuel element 26 is formed so that it includes the cavity 30 therein. As noted above, it is preferred that, once solidified, the body 28 is at least partially translucent. In the alternative, the body 28 of the light-producing simulated fuel element 26 may be made without the cavity 30 formed therein. However, in this case, the cavity 30 is subsequently formed in the body 28 by any other suitable means, e.g., drilling.

As described above, it will be understood that the simulated fuel element 22 which are not light-producing elements 26 may not include the cavity 30. Preferably, the exteriors of the simulated elements 22 which are not light-producing are substantially the same as the exteriors of the light-producing simulated fuel elements 26.

Preferably, when the body 28 of the light-producing fuel element 26 is formed, the body represents the entire log. However, in order to permit the light source subassembly 33 to be inserted into the cavity 30 where the cavity 30 was formed during the creation of the body 28, an aperture 50 preferably is formed in the body 28 which is in communication with the cavity 30. The aperture 50 may be formed in any suitable manner, such as, for example, by drilling.

Preferably, the light assembly 33 (FIG. 4A, 4B), is inserted into the cavity 30 through the aperture 50, to position the LEDs 32 relative to the light-transmitting part(s) 36 as required. After the light assembly 33 has been positioned in the cavity 30, a plug 52 of material is inserted into the aperture 50. The plug material may be any suitable material. Preferably, the plug material is the thermoset material of the body 28 which is cured and colored similarly to the parts of the exterior surface 34 which are adjacent to the aperture 50. If electrical wires are used to connect the PCB 37 to an electrical power source, then such wires are preferably allowed to extend through the aperture 50 before the plug 52 is emplaced in the aperture. The wires are preferably positioned so that they are not generally noticeable to an observer when the light-producing simulated fuel element 26 is positioned in the pile 25 with other elements 22.

Figure 6:
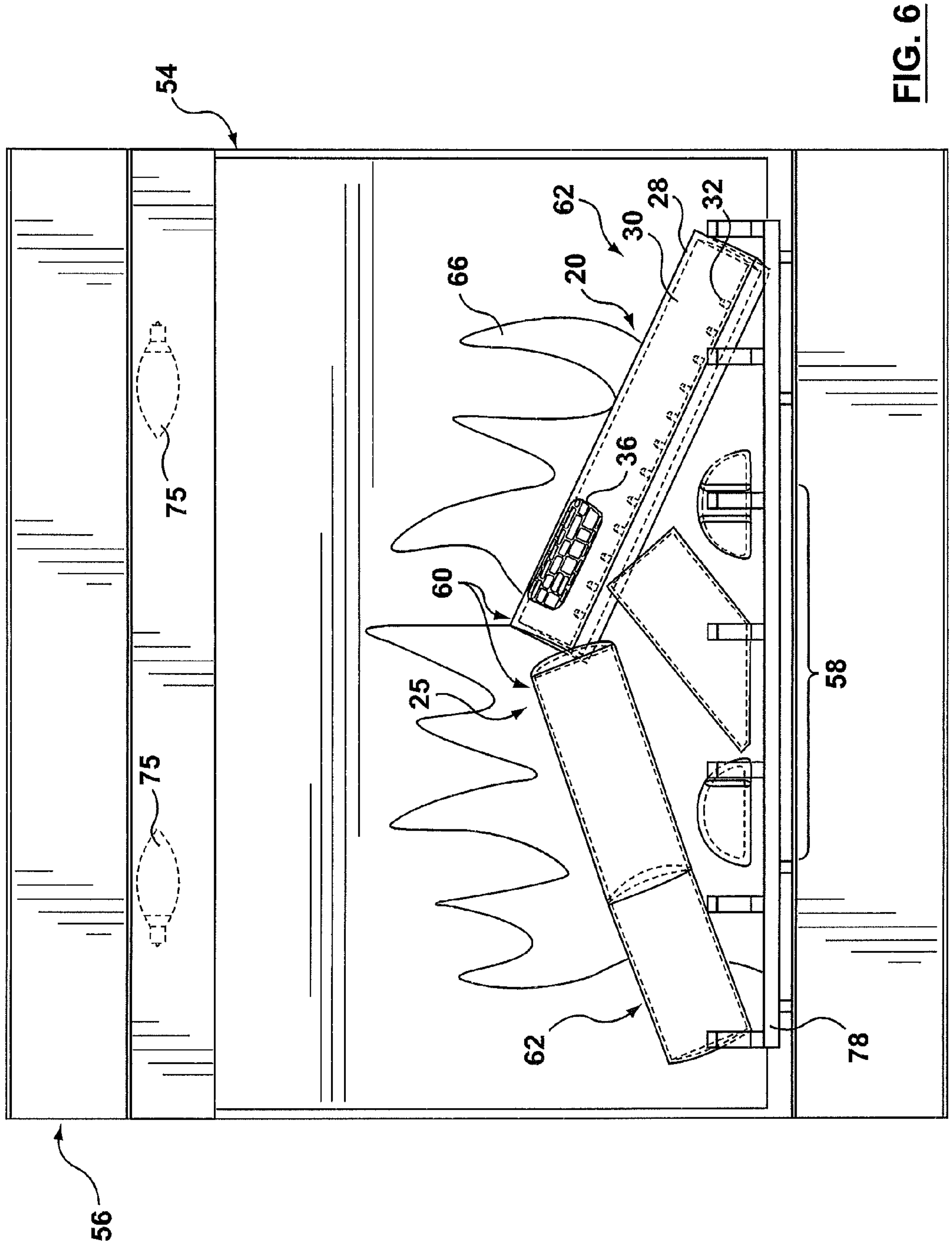
FIG. 6 is a front view of an embodiment of a flame simulating assembly of the invention.
Figure 7:
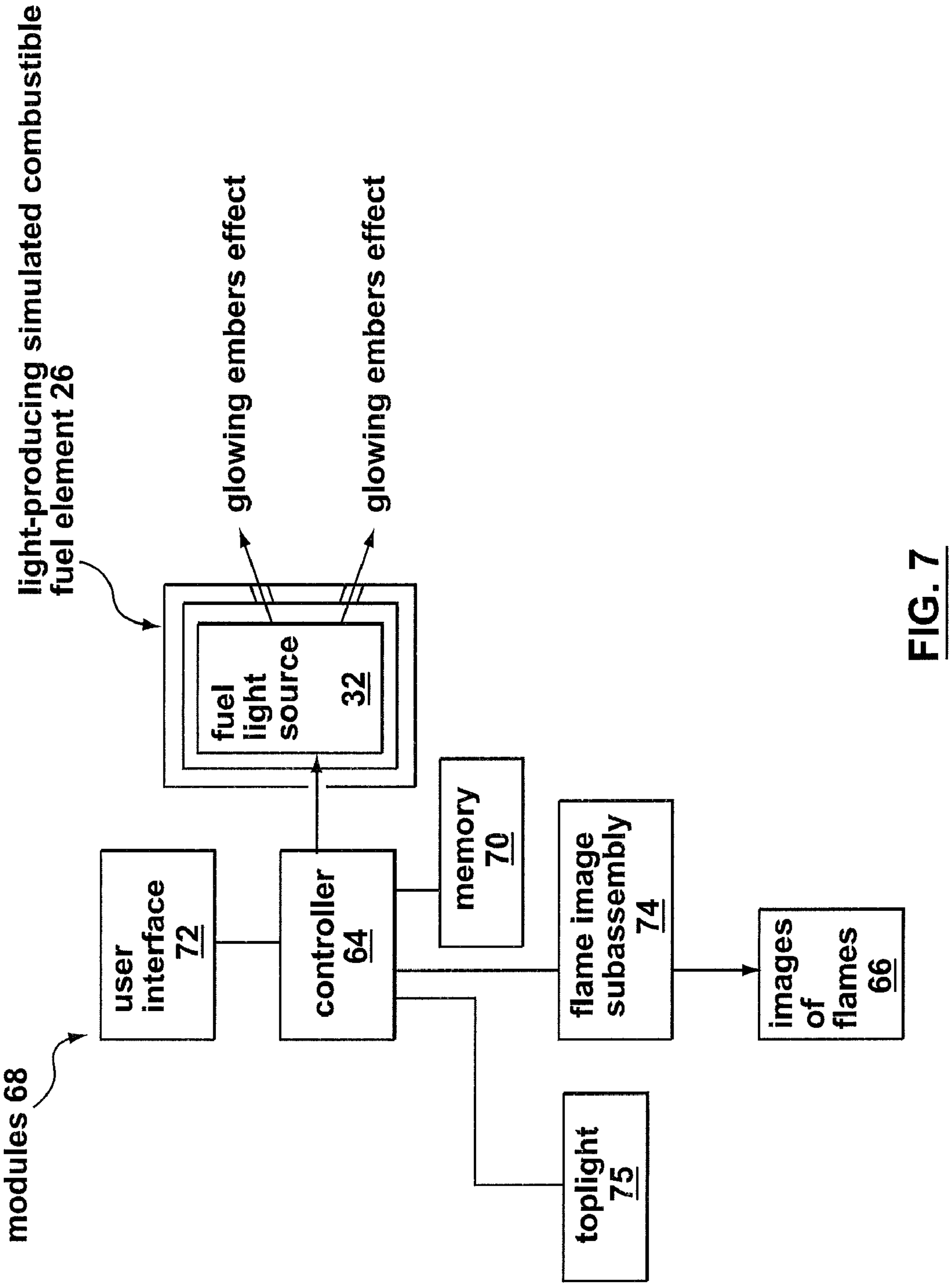
FIG. 7 is a functional block diagram schematically representing an embodiment of the simulated fuel bed of the invention.

As shown in FIG. 6, the pile 25 of simulated fuel elements 22 preferably is positioned in a housing 54 of a simulated fireplace 56. The pile 25 has a central region 58 which is generally positioned centrally relative to the simulated fireplace housing 54. In imitation of a natural fire, portions 60 of the light-producing simulated fuel elements 26 which are located substantially in the central region 58 preferably are treated so that a plurality of light-transmitting parts 36 are located in the portions 60. However, end portions 62 of the light-producing simulated fuel elements 26 which are generally positioned outside the central portion 58 preferably have relatively fewer light-transmitting portions 36. In one embodiment, the fuel light sources 32 are positioned inside the simulated fuel elements 26 substantially in the portions 60. In the alternative, however, the light sources 32 are positioned in the end portions 62 as well as the portions 60, and relatively more paint is layered on the end portions 62 so that light is substantially not directed out of the end portions 62. The central positioning of the light-transmitting portions 36 in the pile 25 results in an improved simulation of glowing embers.

Preferably, the simulated fuel bed 20 also includes a controller 64 (FIG. 7) for controlling the fuel light source 32. For instance, the fuel light source 32 may be controlled by the controller 64 to provide pulsating light, for simulating light from glowing embers. In one embodiment, the controller 64 causes light from the light source 32 to pulsate randomly.

In another embodiment, the controller 64 causes the light from the fuel light source 32 to pulsate systematically, and/or in a predetermined pattern. Preferably, the predetermined pattern in which the light from the fuel light source 32 pulsates is determined in relation to images of flames 66 which are provided in the simulated fireplace 56, to simulate flames emanating from the simulated fuel bed 20 (FIG. 6).

The controller 64 preferably includes one or more modules 68, including a memory storage means 70 and a user interface 72. The controller 64 can include, for example, firmware which provides options selectable by a user (not shown) via the user interface 72. In addition, or in the alternative, direct (manual) control by the user via the user interface 72 may be permitted. Alternatively, the controller 64 could be programmed to cause variations in the light produced by the LEDs 32 in accordance with a predetermined sequence in a program stored in memory 70. The controller 64 also preferably includes any suitable means for causing light created by the light source 32 to vary as required, e.g., a triac to vary voltage as required, as is known in the art.

As shown in FIG. 6, the simulated fuel bed 20 is preferably positioned in the simulated fireplace 56. In one embodiment, the simulated fireplace 56 includes a flame image subassembly 74, for providing the images of flames 66. The simulated fuel bed 20 is preferably positioned in the simulated fireplace 56 so that the images of flames 66 appear to emanate from the simulated fuel bed 20. Such arrangements are disclosed, for example, in U.S. Pat. Nos. 5,642,580 and 6,050,011. Each of U.S. Pat. No. 5,642,580 and U.S. Pat. No. 6,050,011 is hereby incorporated herein by reference.

Also, the controller 64 is programmable to modulate the fuel light source 32 in accordance with one or more selected characteristics of the images of flames 66. For instance, in one embodiment, the controller 64 preferably is programmed so that, upon the speed of rotation of an element in the flame image sub-assembly 74 increasing (i.e., to result in images of flames 66 which flicker faster), the controller 64 causes the rate of pulsation of light from the light source 32 to increase proportionately, but also realistically. It is preferred that increases in pulsation not correspond directly (i.e., linearly) to increases in the rate at which the flame effect flickers.

In another embodiment, the simulated fireplace 56 also includes one or more toplights 75 positioned above the simulated fuel bed 20 (FIG. 6). The toplight 75 provides light directed downwardly onto the simulated fuel bed 20 and simulates light from flames which illuminates the fuel in a natural fire, thereby adding to the simulation effect provided by the simulated fireplace 56. The use of a toplight in a simulated fireplace is described in U.S. Pat. No. 6,385,881, which is hereby incorporated hereby by reference.

In another embodiment, the controller 64 is programmable to modulate the toplight 75, for example, in accordance with one or more selected characteristics of the images of flames 66.

As described above, the LEDs 32 can be constructed so as to emit light having different colors. Preferably, LEDs 32 which produce different colors are arranged relative to each other in an element 26, and also in a plurality of elements 26, and modulated by the controller 64 to produce pulsating light respectively, together or separately as the case may be, to provide a realistic glowing ember effect through the light-transmitting part 36. Each of the light sources 32 is adapted to pulsate independently in accordance with signals received from the controller 64, if so desired.

The arrangements of the LEDs 32 relative to each other preferably takes into account LEDs inside the same light-producing simulated fuel element 26. In addition, however, the positioning of LEDs 32 producing light with various colors should also take into account the LEDs 32 in all of the light-producing fuel elements 26 in the pile 25, and in particular, LEDs 32 positioned in adjacent elements 26.

In one embodiment, the simulated fuel bed 20 preferably includes a simulated ember bed 76 (FIG. 4A). In this embodiment, the plurality of simulated combustible fuel elements 22 are preferably positionable at least partially above the simulated ember bed 76, as shown in FIG. 4A.

As can also be seen in FIGS. 4B and 6, the simulated fuel bed optionally includes a simulated grate element 78 for simulating a grate in a fireplace. The simulated combustible fuel elements 22 are positionable on the simulated grate element 78. It is preferred that an alternative embodiment of a simulated ember bed 80 also is positioned beneath the grate element 78.

In use, the user selects the desired control option using the user interface 72, to control (via the controller 64) light provided by the fuel light sources 32. Preferably, the controller 64 is adapted to control light sources 32 in a number of light-producing simulated solid combustible fuel elements 26 in the simulated fuel bed 20. In one embodiment, the light-producing elements 26 are positioned substantially near the bottom of the pile 25 (FIG. 6).

Additional embodiments of the invention are shown in FIGS. 8-16. In FIGS. 8-16, elements are numbered so as to correspond to like elements shown in FIGS. 1-7.

Figure 8:
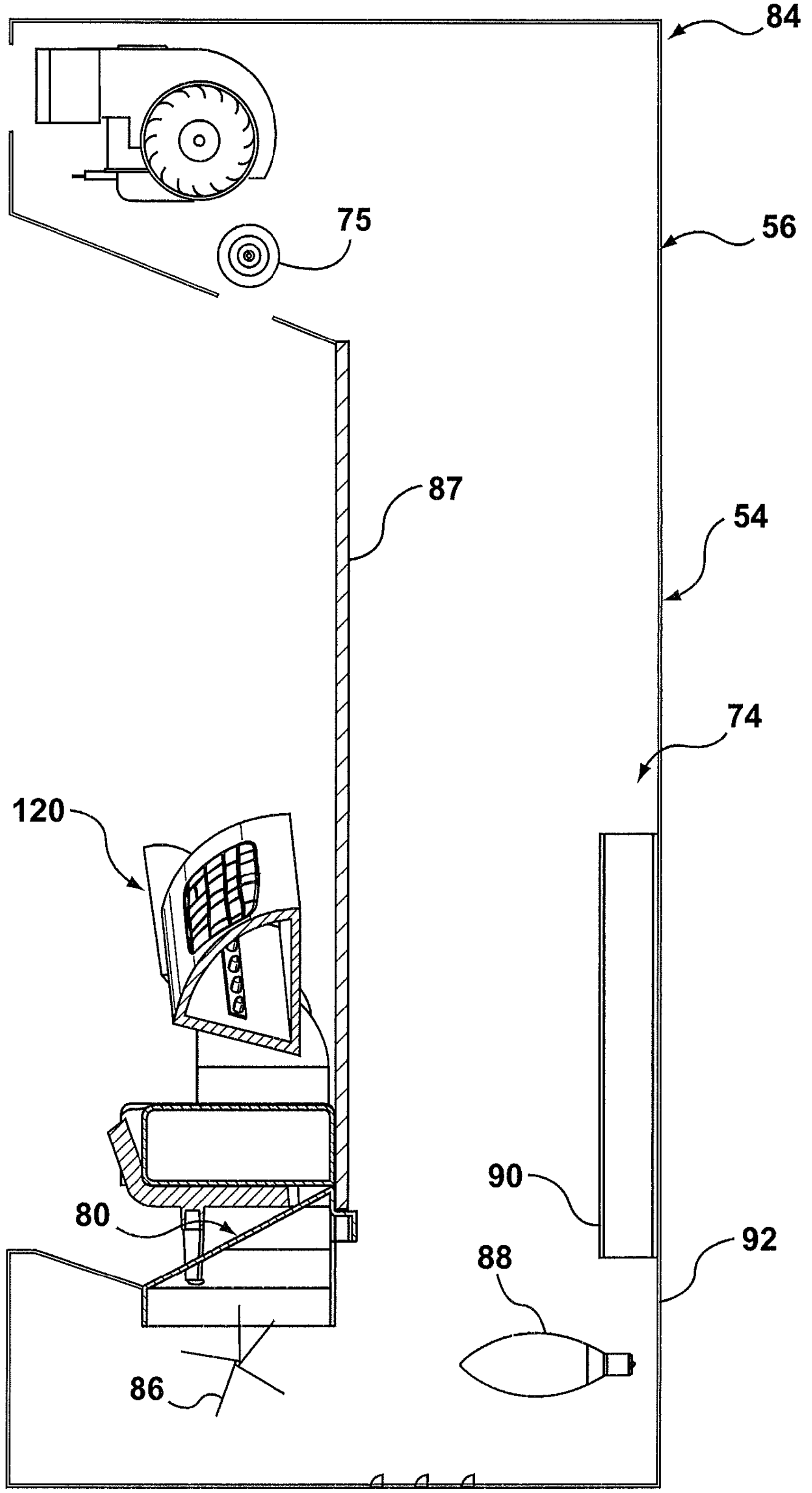
FIG. 8 is a cross-section of the flame simulating assembly of FIG. 6.

As can be seen in FIG. 8, a flame simulating assembly 84 includes the simulated fireplace 56 which has the flame image subassembly 74 for providing images of flames 66. Different types of flame image subassemblies 74 are known in the art. For instance, the flame image subassembly 84 shown in FIG. 8 includes a flicker element 86 for causing the images of flames 66 to fluctuate, for simulating flames. As shown in FIG. 8, the flame simulating assembly 84 also preferably includes the simulated fuel bed 120. The flame image subassembly 74 positions the images of flames 66 (i.e., the images of flames are transmitted through a screen 87) so that the images of flames 66 appear to emanate from the simulated fuel bed 120 (FIG. 6). The simulated fuel bed 120 includes the simulated ember bed 76 which is positioned below the simulated grate element 78. The simulated fuel elements 22 are positioned in the grate 78 in a realistic pile 25.

As shown in FIG. 8, the flicker element 86 is preferably located underneath the simulated ember bed 80. The flame image subassembly 84 preferably also includes one or more flame light sources 88 and a flame effect element 90. Also, as shown in FIG. 8, the simulated fireplace 56 also preferably includes the housing 54 with a back wall 92, and the flame effect element 90 is preferably located on the back wall 92.

In the flame image subassembly 74 shown in FIG. 8, the flame light source 88 is located generally below the simulated ember bed 80 and adjacent to the back wall 92. Preferably, the light produced by the flame light source 88 is modulated to provide such changes in the images of flames 66 as may be desired. Also, the speed at which the flicker element 86 is rotated can also be varied, to provided any desired changes in the images of flames 66.

Figure 9:
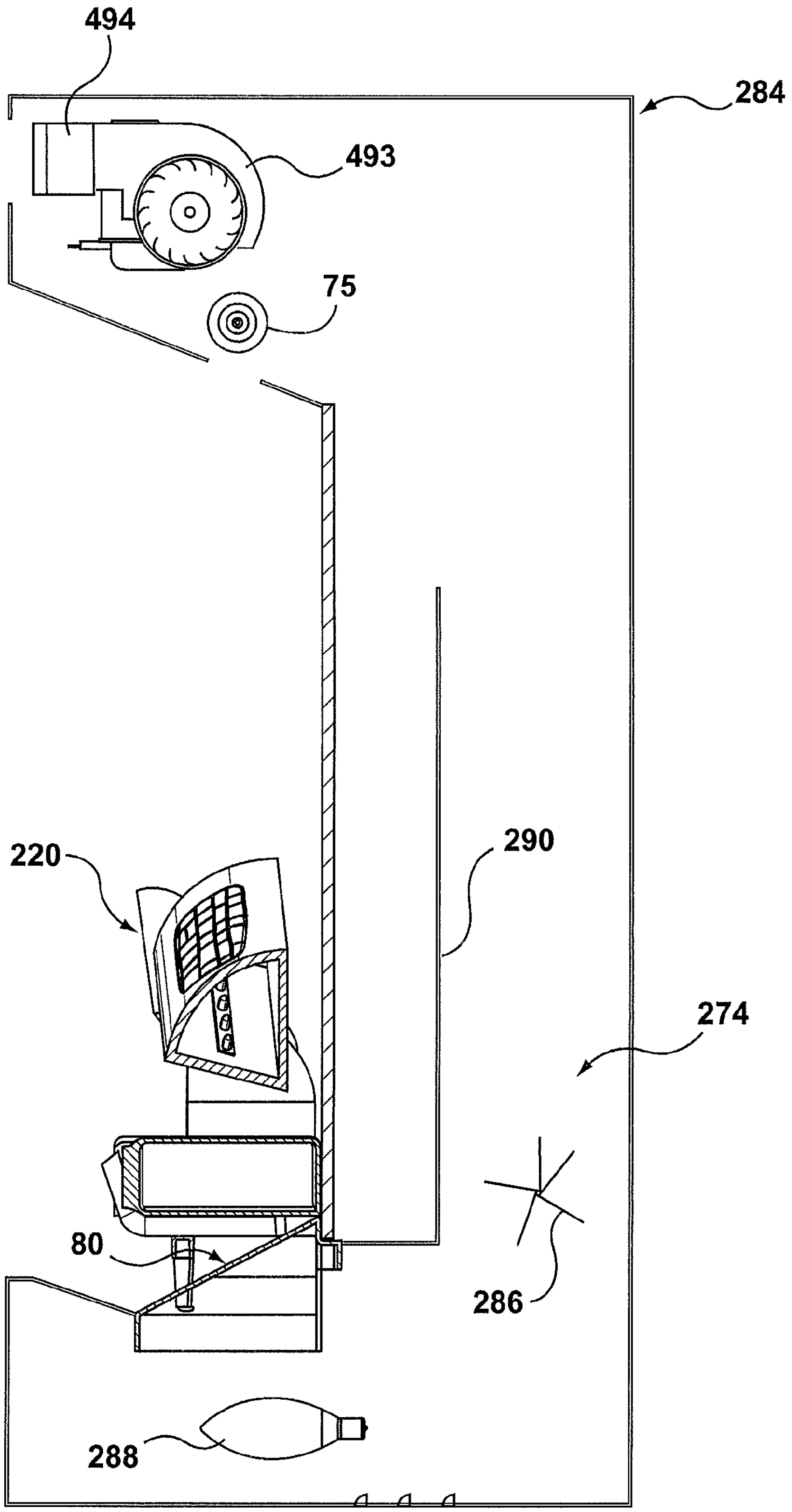
FIG. 9 is a cross-section of an alternative embodiment of the flame simulating assembly of the invention.

Another embodiment of a flame simulating assembly 274 is shown in FIG. 9. As shown in FIG. 9, the flame simulating assembly 274 includes a flame image subassembly 284 which includes a flicker element 286, a flame light source 288, and a flame effect element 290. The simulated fuel bed 220 is positioned so that the images of flames 66 appear to emanate from the simulated fuel bed 220. As can be seen in FIG. 9, the flame light source 288 is preferably located directly underneath the simulated ember bed 80 in this embodiment. The flicker element 286 is, in this embodiment, positioned adjacent to the back wall 292.

Figure 10:
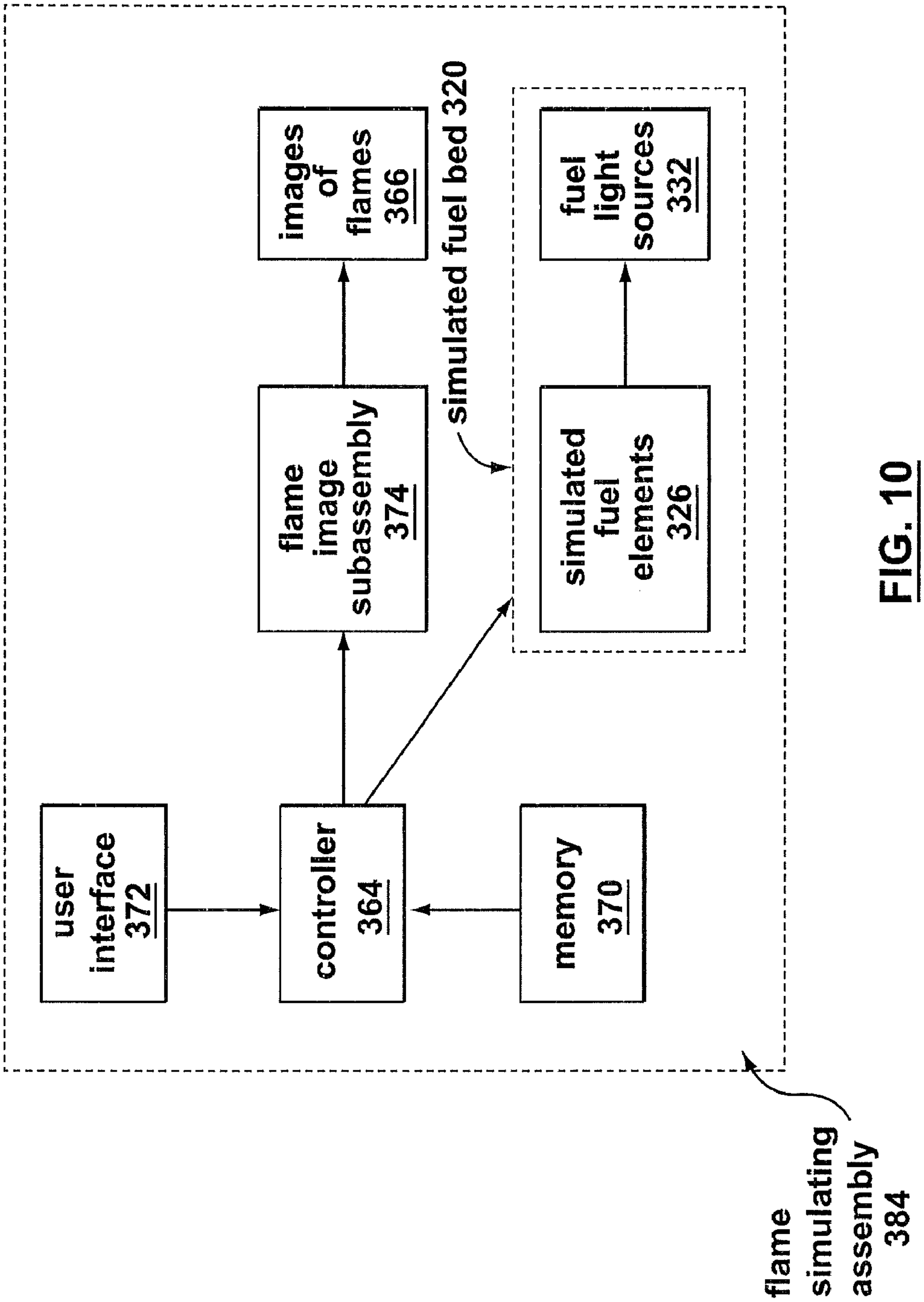
FIG. 10 is a functional block diagram of an alternative embodiment of the invention.

In another embodiment, the flame simulating assembly 384 includes a controller 364 which is adapted to effect a predetermined sequence of changes in the images of flames 366. Preferably, the controller causes a flame image subassembly 374 to provide the predetermined sequence of changes (FIG. 10). For example, the predetermined sequence of changes may include a gradual increase in intensity of the images of flames 66.

For the purposes hereof, intensity of light produced by a light source refers to the amount of light per unit of area or volume. For example, intensity may be measured in units of lumens or candelas per square meter.

Preferably, the predetermined sequence of changes are in accordance with software stored in a memory storage means 370 accessible by the controller 364. The predetermined sequence of changes may proceed at a preselected rate. Also, the preselected rate may be determined by the controller 364, if preferred. In another embodiment, the controller 364 is controllable by the user via a user interface 372 and the predetermined sequence of changes proceeds at a rate determined by the user via the user interface 372.

In the preferred embodiment, the flame simulating assembly 384 also includes at least one fuel light source 332 positioned in one or more light producing simulating fuel elements 326 in the simulated fuel bed 320, to simulate glowing embers.

Preferably, the controller 364 is operable in a start-up mode, in which a gradual increase in intensity of light providing the images of flames 366 takes place. In one embodiment, upon commencement of the predetermined sequence of changes, the intensity of the light providing the images of flames 366 is relatively low, so that the predetermined sequence of changes (i.e., a gradual increase in intensity of light providing the images of flames 366) resembles a natural fire during commencement thereof. In an alternative embodiment, prior to commencement of the predetermined sequence of changes, the images of flames 366 are substantially nonexistent.

Similarly, in an alternative embodiment, the light providing the images of flames 366 is gradually decreased in intensity by the controller 364. The decrease preferably proceeds until the images of flames 366 are substantially nonexistent, i.e., the gradually decreasing images of flames 366 resemble a natural fire which is gradually dying.

Figure 11:
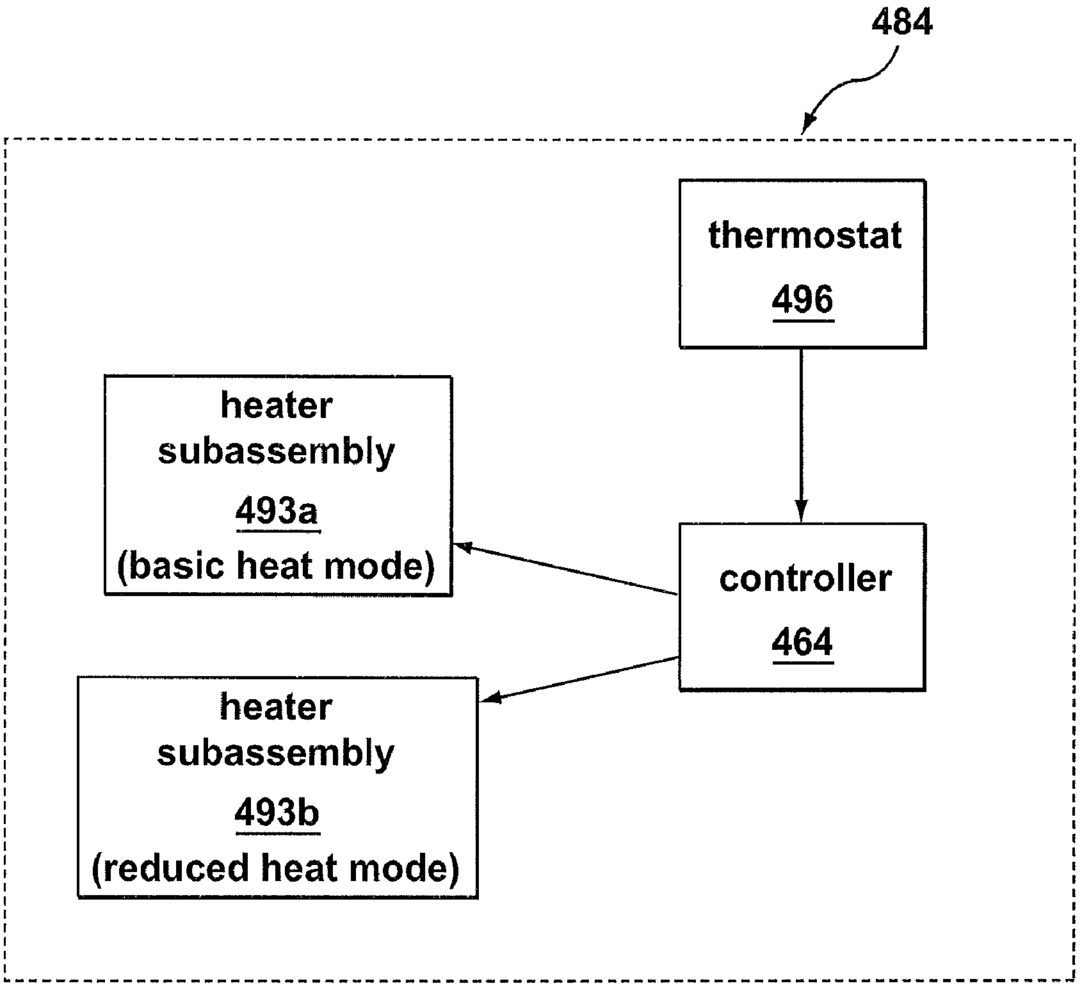
FIG. 11 is a functional block diagram of another embodiment of the invention.

In another alternative embodiment, the flame simulating assembly 484 includes a heater subassembly 493 (FIG. 9) with one or more heater elements 494 therein, and preferably including a fan and a fan motor. The heater subassembly 493 is adapted to operate in a basic heat mode 493*a* (FIG. 11), in which the heater subassembly consumes a first amount of electrical power, and also to operate in a reduced heat mode 493*b* (FIG. 11), in which the heater subassembly 493 consumes a second amount of electrical power. The first amount of electrical power is substantially greater than the second amount of electrical power. The flame simulating assembly 484 also includes a controller 464 which includes a means for converting the heater subassembly 493 between the basic heat mode and the reduced heat mode (FIG. 11).

The flame simulating assembly 484 preferably also includes a thermostat 496 for controlling the heater subassembly 493. The thermostat 496 is adapted to operate the heater subassembly 493 in the basic heat mode upon ambient temperature differing from a preselected temperature by more than a predetermined difference. Also, the thermostat is adapted to operate the heater subassembly 493 in the reduced heat mode upon ambient temperature differing from the preselected temperature by less than the predetermined difference.

Figure 16:
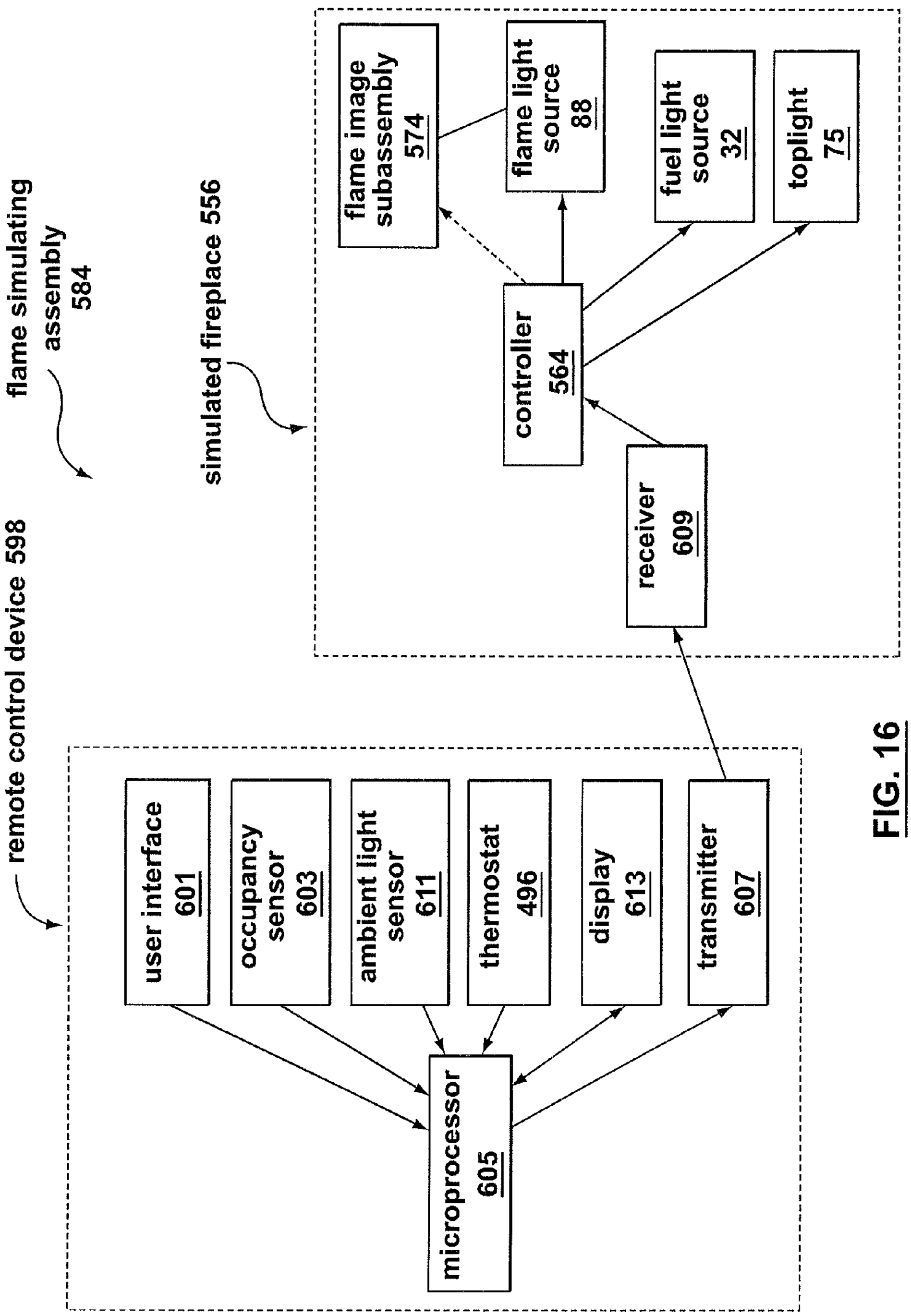
FIG. 16 is a functional block diagram illustrating functional aspects of the remote control device of the invention.

As shown in FIGS. 12-16, a flame simulating assembly 584 of the invention preferably includes a remote control device 598 for controlling a simulated fireplace 556. Preferably, the remote control device 598 includes a user interface 601 for receiving input from the user and converting the input into input signals. The remote control device 598 preferably also includes an occupancy sensor 603 for detecting motion. The occupancy sensor 603 is adapted to generate occupancy-related signals upon detection of motion. Also, the remote control device includes a microprocessor 605 and a transmitter 607 (FIG. 16). The microprocessor 605 is for converting the input signals and the occupancy-related signals into output signals. The transmitter 607 is for transmitting the output signals to a receiver 609 which is preferably positioned on the simulated fireplace 556. The receiver 609 is operatively connected to a controller 564 which controls the simulated fireplace 556. Accordingly, the simulated fireplace 556 is controllable by the user via input signals and by the occupancy-related input signals which are transmitted from the remote control device 598 to the receiver 609, and subsequently to the controller 564.

Preferably, the occupancy sensor 603 is adapted to send an activation signal to the controller 564 upon detection of motion. The activation signal is one of the occupancy-related signals which are transmitted from the remote control device to the receiver 609 which is operatively connected to the controller 564, as described above. It is also preferred that the occupancy sensor 603 is also adapted to send a de-activation signal to the controller upon a sensor failing to detect motion during a predetermined time period (FIG. 16). The de-activation signal is another of the occupancy-related signals. The controller 564 preferably is adapted to activate the simulated fireplace 556 upon receipt of the activation signal. Also, the controller 564 preferably is adapted to de-activate the simulated fireplace 556 upon receipt of the de-activation signal.

Preferably, the remote control device additionally includes an ambient light sensor 611. The ambient light sensor 611 is for sensing ambient light intensity. For the purposes hereof, ambient light intensity refers to the amount of ambient light per unit of area or volume. The ambient light in question is the light generally around, or in the vicinity of, the simulated fireplace and/or the user.

Preferably, the ambient light sensor 611 provides substantially automatic adjustment of the light provided by one or more light sources in a simulated fireplace 556 to provide an improved simulation effect. The light sources thus adjusted preferably include any or all of the toplight 75, the flame light source 88, and the fuel light source 32. In one embodiment, the ambient light sensor 611 is adapted to provide a first signal which is transmitted to the controller 564 upon the ambient light intensity being greater than a predetermined first ambient light intensity. The ambient light sensor 611 is also preferably adapted to provide a second signal which is transmitted to the controller 564 upon the ambient light intensity being less than a predetermined second ambient light intensity. The controller 564 is adapted to increase the intensity of the light provided by the light source (i.e., being any one or all of the toplight 75, the flame light source 88, and the fuel light source 32) upon receipt of the first signal, up to a predetermined maximum. Also, the controller 564 is adapted to decrease the intensity of the light provided by the light source upon receipt of the second signal, to a predetermined minimum.

In an alternative embodiment, the ambient light sensor 611 is adapted to cause the controller 564 to effect a preselected change in the intensity of the light supplied by the light source upon the ambient light intensity differing from the intensity of light from the light source to a predetermined extent. For example, the light source could be adjusted so that light provided by the light source has an intensity which is substantially proportional to the ambient light intensity. As noted above, the light source could be all or any one of the toplight 75, the flame light source 88, and the fuel light source 32.

Figure 12:
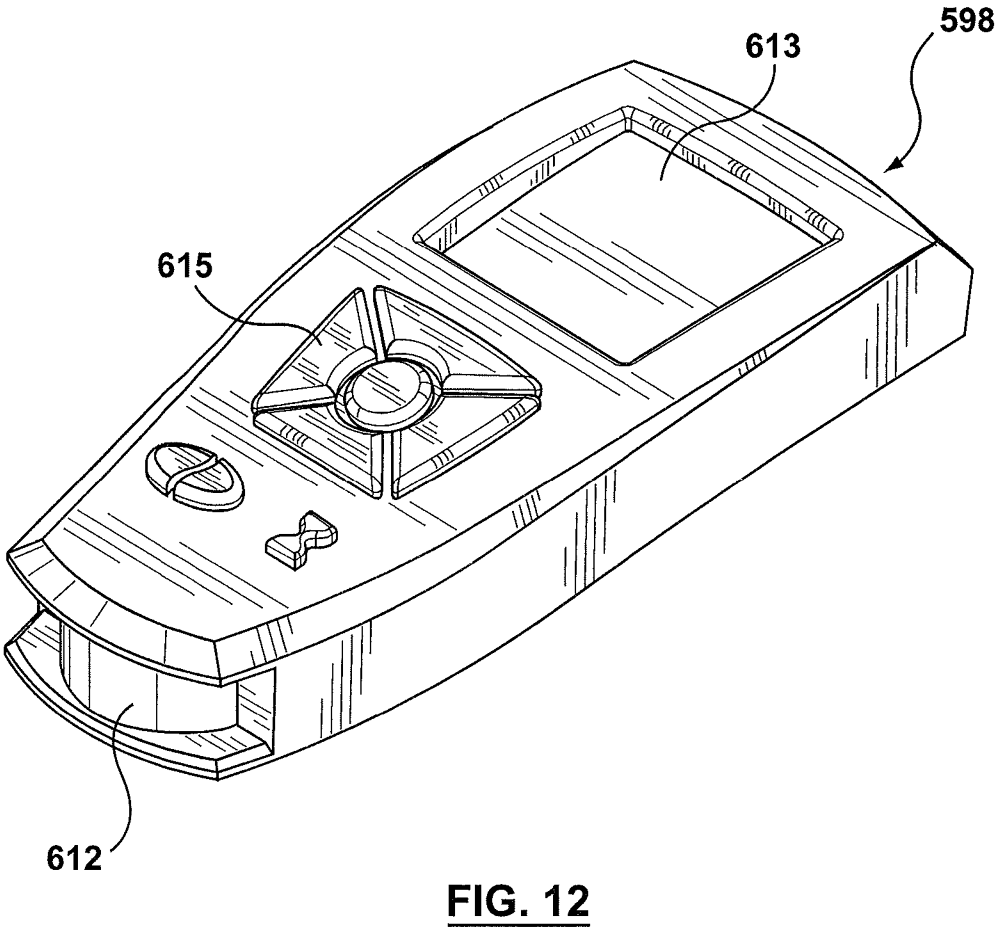
FIG. 12 is an isometric view of an embodiment of a remote control device of the invention.
Figure 13:
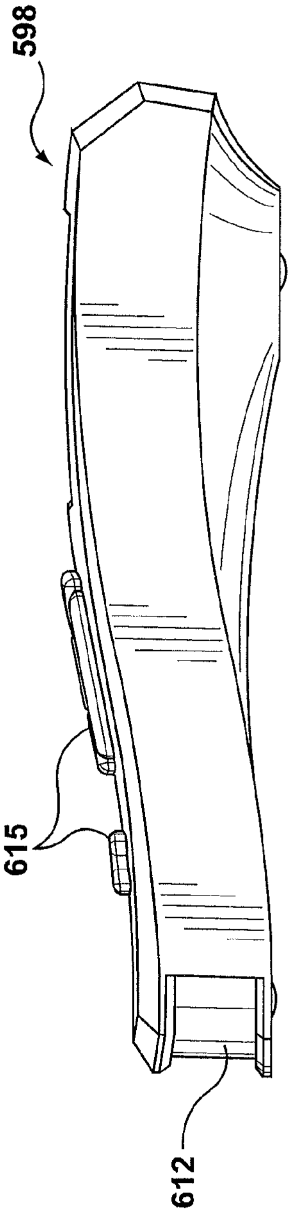
FIG. 13 is an elevation view of a side of the remote control device of FIG. 12.
Figure 15:
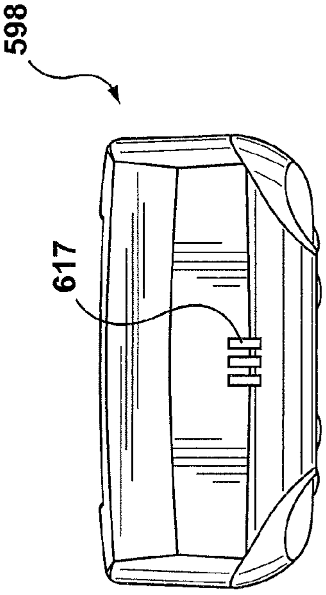
FIG. 15 is an elevation view of a front end of the remote control device of FIG. 12.
Figure 14:
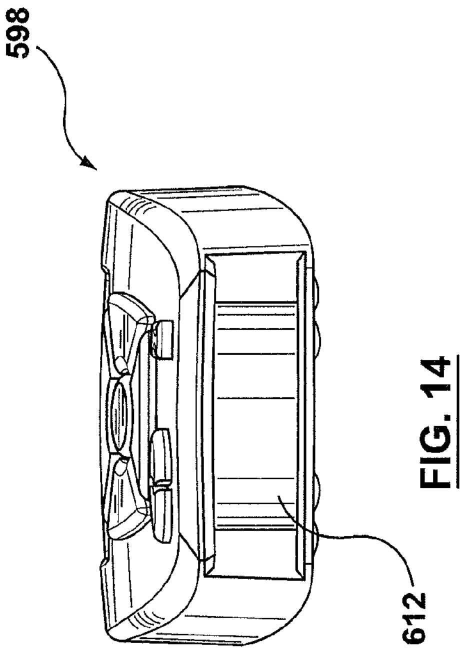
FIG. 14 is an elevation view of a back end of the remote control device of FIG. 12.

As can be seen in FIGS. 12-15, the occupancy sensor 603 and the ambient light sensor 611 preferably are positioned on the remote control device 598. Preferably, the occupancy light sensor 603 includes a screen or lens 612 through which ambient light is transmittable (FIGS. 12-14). It is preferred that the ambient light sensor 611 also be positioned behind the screen 612. Positioning the occupancy sensor 603 in the remote control device 598 provides the advantage that the occupancy sensor 603 is likely to detect motion because it is positioned on the remote control device 598. Also, the ambient light sensor 611 senses ambient light generally in the vicinity of the user. Preferably, the remote control device includes a display screen 613 which, for example, may be a LCD display. The remote control device 598 also includes control buttons 615, to be used to enable the user to provide input.

It is also preferred that the thermostat 496 (preferably, in the form of a thermistor) is positioned in the remote control device 598, behind apertures 617 provided to enable ambient air to reach the thermistor. The advantage of having the thermistor positioned in the remote control device 598 is that temperature will be adjusted in accordance with the temperature of the ambient air generally in the vicinity of the user.

The display screen 613 is for displaying data regarding input signals and, preferably, output signals. Input from the user is receivable via the display screen, in one embodiment.

In an alternative embodiment, the receiver 609 is a transceiver, and information (data) is transmittable to the remote control device 598 from the controller 564 through the receiver 609. In this case, the transmitter 607 is also a transceiver.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A method of forming a simulated combustible fuel element for simulating a semi-burned combustible fuel element, the method comprising the steps of:

(a) covering a surface of the semi-burned combustible fuel element with a material selected to produce a resiliently flexible mold;

(b) after the selected material has set, removing the semi-burned combustible fuel element from the mold;

(c) introducing a predetermined amount of a liquefied body material into the mold;

(d) rotating the mold to produce a body comprising said body material and resembling the semi-burned combustible fuel element, the predetermined amount being sufficient to provide the body with at least one cavity therein and an exterior surface simulating the surface of the semi-burned combustible fuel element;

(e) curing the body to solidify said body material;

(f) removing the mold from the body;

(g) positioning at least one light source at least partially in said at least one cavity; and (h) coating at least a portion of the exterior surface in accordance with a predetermined exterior surface pattern to provide:

at least one light-transmitting part positioned in a path of light from said at least one light source, said at least one light-transmitting part being colored to resemble glowing embers of the combustible fuel upon transmission therethrough of light from said at least one light source; and at least one substantially opaque exterior part for substantially preventing transmission of light from said at least one light source therethrough colored to resemble a non-ember part of the combustible fuel.

2. A method according to claim 1 additionally comprising, after step (f), the step of forming an access hole in the body in communication with said at least one cavity, to permit said at least one light source to be at least partially inserted in said at least one cavity through the access hole.

3. A method according to claim 2 additionally comprising, after said at least one light source is at least partially positioned in said at least one cavity, the step of inserting plug material into the access hole to substantially block the access hole.

4. A method according to claim 1 in which the material of step (a) is silicone rubber.

5. A method of forming a simulated combustible fuel element for simulating a semi-burned combustible fuel element, the method comprising the steps of:

(a) covering a surface of the semi-burned combustible fuel element with a material selected to produce a resiliently flexible mold;

(b) after the selected material has set, removing the semi-burned combustible fuel element from the mold;

(c) introducing a predetermined amount of a liquefied body material into the mold;

(d) rotating the mold to produce a body comprising said body material and resembling the semi-burned combustible fuel element, the predetermined amount being sufficient to provide the body with at least one cavity therein and an exterior surface simulating the surface of the semi-burned combustible fuel element, the body additionally comprising at least one aperture extending between the exterior surface and said at least one cavity;

(e) curing the body to solidify said body material;

(f) removing the mold from the body;

(g) positioning at least one light source in said at least one cavity in relation to said at least one aperture to permit light from said at least one light source to be transmitted through the aperture, to resemble glowing embers of the combustible fuel.

6. A method according to claim 5 in which at least a portion of the exterior surface of the body is coated in accordance with a predetermined exterior surface pattern such that the exterior surface resembles the surface of the semi-burned combustible fuel element.

7. A method according to claim 5 additionally comprising, after step (f), the step of forming an access hole in the body in communication with said at least one cavity, to permit said at least one light source to be at least partially inserted in said at least one cavity through the access hole.

8. A method according to claim 7 additionally comprising, after said at least one light source is at least partially positioned in said at least one cavity, the step of inserting plug material in the access hole to substantially block the access hole.

9. A method according to claim 5 in which the material of step (a) is silicone rubber.

10. A method of forming a simulated combustible fuel element for simulating a semi-burned combustible fuel element, the method comprising the steps of:

(a) covering a surface of the semi-burned combustible fuel element with a material selected to produce a resiliently flexible mold;

(b) after the selected material has set, removing the semi-burned combustible fuel element from the mold;

(c) introducing a predetermined amount of a liquefied body material into the mold;

(d) rotating the mold to produce a body comprising said body material and resembling the semi-burned combustible fuel element, the predetermined amount being sufficient to provide the body with at least one cavity therein and an exterior surface simulating the surface of the semi-burned combustible fuel element, the body comprising at least one light passage;

(e) curing the body to solidify said body material;

(f) removing the mold from the body; and (g) positioning at least one light source at least partially in said at least one cavity such that said at least one light passage is located in a path of light from said at least one light source, said at least one light passage resembling glowing embers of the combustible fuel upon transmission therethrough of light from said at least one light source.

11. A method according to claim 10 in which said at least one light passage comprises at least one light-transmitting part.

12. A method according to claim 10 in which said at least one light passage comprises at least one aperture extending between the exterior surface and said at least one cavity.

* * * * *